(No Model.)

T. MIDGLEY.
HOSE OR TUBING.

No. 398,426. Patented Feb. 26, 1889.

Witnesses
Wm. H. Scott.
M. A. Reinohl.

Inventor
Thomas Midgley
By Johnston, Reinohl
Attorneys

United States Patent Office.

THOMAS MIDGLEY, OF BEAVER FALLS, PENNSYLVANIA, ASSIGNOR OF ONE-HALF TO JAMES E. EMERSON, OF SAME PLACE.

HOSE OR TUBING.

SPECIFICATION forming part of Letters Patent No. 398,426, dated February 26, 1889.

Application filed July 18, 1888. Serial No. 280,288. (No model.)

*To all whom it may concern:*

Be it known that I, THOMAS MIDGLEY, a citizen of the United States, residing at Beaver Falls, in the county of Beaver and State of Pennsylvania, have invented certain new and useful Improvements in Hose or Tubing; and I do hereby declare the following to be a full, clear, and exact description of the invention, such as will enable others skilled in the art to which it appertains to make and use the same.

My invention relates to hose or tubing, and has for its object the construction of hose of great strength for hydraulic mining, firemen's service, steam-heating, air-brake, pneumatic mining, and any other purpose in which high pressure is required.

The invention has special reference to an improvement on the hose shown and described in Patents Nos. 386,306 and 386,307, bearing date of July 17, 1888, and will be hereinafter described, and particularly pointed out in the claims.

Figure 1:
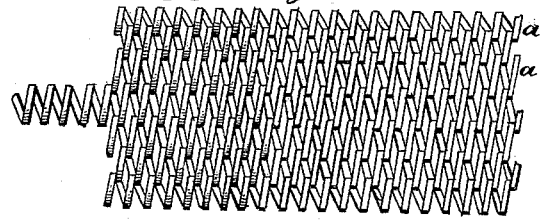
Figure 2:
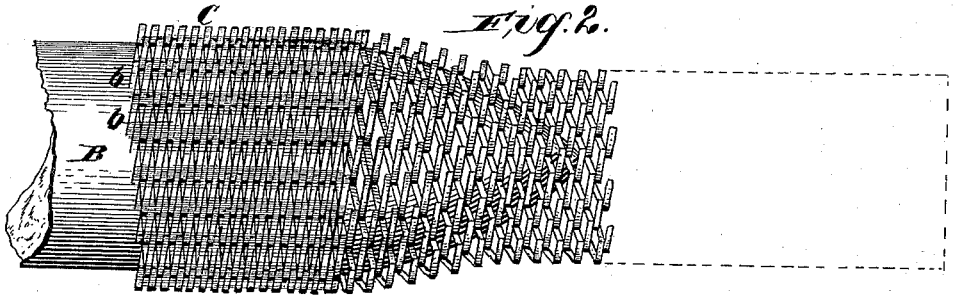
Figure 3:
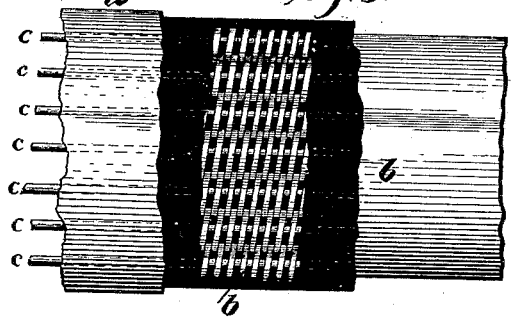
Figure 4:
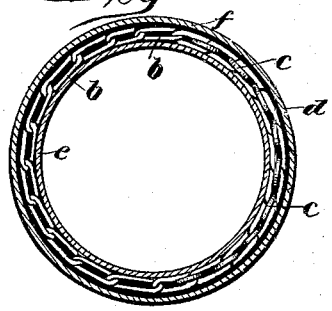

In the accompanying drawings, which form part of this specification, Figure 1 represents a plan view, partly in section, of a tube of coiled sections of wire. Fig. 2 is a similar view of a tube and a mandrel for stretching the links of the coils. Fig. 3 is a side view, partly in section, of the completed hose, and Fig. 4 is an end view of a section of the hose.

The hose shown in the applications referred to is capable of resisting an internal pressure exerted circumferentially equal to the tensile strength of the wire from which the body of the hose is made, but will stretch longitudinally when the pressure exceeds that required to stretch the links of which the body is composed. To overcome this difficulty, I have re-enforced the hose with wire, so that it will possess the same power or degree of resistance in both directions.

Reference being had to the drawings and the letters marked thereon, A represents a tube formed of sections $a$ of coiled-wire helices intertwined longitudinally, as shown in Fig. 1, which form links $b$. In forming this tube the sections $a$ are coiled in suitable lengths and of a diameter to adapt them to the diameter of the hose desired. In practice I have found that the sections $a$ can be worked of various lengths, from sixteen feet to the entire length of a section of hose, which is usually fifty feet.

The tube A is formed by intertwining section $a$ longitudinally in a sheet or body until a width has been obtained equal to about two-thirds of the circumference of the desired internal diameter of the completed hose. The sheet is then lapped or folded and the two outer sections, $a$, joined by another similar section, when the tube is complete. After the tube A has been formed by intertwining its sections it is heated and forced over a mandrel, B, having a tapering end to enter the tube and gradually stretch the helices into links $b$ and expand the tube, as shown at C in Fig. 2.

After the tube has been expanded and the links $b$ formed it is re-enforced by inserting strands of wire $c$ in or between the links, the strands extending throughout the entire length of the section of hose made. At the ends of sections the wire strands are bent into an adjacent link, as shown in Fig. 4. The tube may then be tempered, if desired. After having re-enforced the tube to resist longitudinal extension it is provided with a covering, $d$, of rubber or gutta-percha, and the whole subjected to heat, by which the rubber is softened sufficiently to enable it to be forced into and through the interstices between the links in the tube A and form a compound inner surface of metal and rubber, or rubber alone, the rubber completely filling the interstices and rendering the hose or tubing absolutely water-repellent and air-tight.

The rubber may be forced into the interstices by passing the tube between rolls having a pass in them conforming to the external diameter of the finished hose, the tube being supported upon a suitable mandrel and the rolls heated to about 172° Fahrenheit.

The tube may be provided with a lining and covering of canvas previously coated or treated with rubber; or a compound for the purpose which renders the canvas water-repellent and becomes adhesive under heat may be applied. The hose may thus be made to present a rubber external surface and a rubber or compound internal surface; or it may be provided with a lining, e, and a covering, f, of canvas, which will adhere to the rubber and form a homogeneous body.

Hose thus constructed is capable of resisting great external as well as internal pressure, and may be driven over by ordinary road-vehicles when filled with fluid without injury to the hose or the motor supplying the fluid, while it is sufficiently flexible to be handled and wound upon a reel, and may be used in any place and for any purpose to which ordinary rubber or cotton hose is applied.

Having thus fully described my invention, what I claim is—

1. Hose or tubing composed of a body formed of intertwined sections of coiled wire having the helices expanded into links running in the direction of the circumference of the tube, and provided with a longitudinal re-enforcement, the links and the re-enforcement being embedded in and covered with rubber or equivalent material.

2. Hose or tubing composed of a body formed of intertwined sections of coiled wire having the helices expanded into links, and provided with a longitudinal re-enforcement within or between the links, the whole embedded in and covered with rubber or its equivalent material, substantially as described.

In testimony whereof I affix my signature in presence of two witnesses.

THOMAS MIDGLEY.

Witnesses:
J. F. MERRIMAN,
WM. C. GALTON.